United States Patent Office 3,435,747
Patented Apr. 1, 1969

3,435,747
ELECTROMAGNETIC CONTROLLING DEVICE FOR EXPOSURE
Ichiro Yoshiyama and Masaichiro Konishi, Osaka, Japan, assignors to Minolta Camera Kabushiki Kaisha, Osaka, Japan, a corporation of Japan
Filed Sept. 16, 1965, Ser. No. 487,759
Claims priority, application Japan, Sept. 28, 1964, 39/55,452
Int. Cl. C03b 9/02, 7/08; G01d 5/34
U.S. Cl. 95—64           3 Claims

ABSTRACT OF THE DISCLOSURE

An electromagnetic exposure controlling device in which an iris diaphragm is coupled to a rotor member of a galvanometer which has two coils wound thereon each placed in a respective leg of a Wheatstone bridge circuit, one being connected in series with a photocell and the other in series with an adjustable compensation resistance related to film sensitivity, shutter speed, diaphragm opening and the like. The coils are placed in the circuit so that current flows in opposite directions therethrough to establish a balancing relationship as between the opening of the iris diaphragm, the illumination of the subject to be photographed and the adjustment of the compensation resistance.

---

This invention relates to a novel electro-magnetic exposure controlling device, which is capable of automatically indicating an exposure for cameras.

According to the present invention, around a single and the same coil-frame of the exposure meter are wound double coils, through one of which electric current pertaining to light sensing elements is passed, while through the other electric current pertaining to the ASA sensitivity of films being used, iris value, i.e., diaphragm or stop degree, shutter time and so forth is reversely passed through the other coil so that the desirable exposure is established when an equilibrium is produced therebetween. Hence, the following advantages are obtainable.

(1) The electrical source does not always need to comprise a mercury cell for operating the controlling device, and when equipped with a motor driving cell as in an 8 mm. cinecamera, this cell can be used also for that purpose, because the discharging characteristic of the cell is irrespective in this case.

(2) The errors produced during working of the iris aperture can be eliminated and, in consequence, a proper exposure is always obtainable.

(3) Since only one point is sufficient to be taken into consideration for the illumination intensity to the photoelectric element or for the ASA sensitivity, the range becomes narrower than the usual device and consequently the combination of the photoelectric element with the galvanometer or ammeter is made more easily.

(4) When a light controlling method is used for the ASA sensitivity the illumination intensity of the photoelectric element is always used at one point and consequently light-resistance characteristics of the photoelectric element and characteristics of the ammeter as in the usual device are eliminated and simultaneously, the combination of them becomes very easy, which serves greatly to decrease the production cost.

(5) Hair springs may be omitted.

(6) Since adjusting of ASA sensitivity, shutter speed and iris value is effected electromagnetically, parallel shifting of the characteristics can be performed more easily as compared with usual electrical or mechanical apparatus.

In the following, the present invention having foregoing features and advantages shall be described by way of example and in reference with the accompanying drawings, in which FIG. 1 is a schematic plan view of the device according to the present invention;

It should be noted that the present invention is not limited to the embodiment of the invention as explained in the following description, but can be modified, and not depart from the spirit of the present invention. In the figures, similar symbols are used to designate similar portions.

Figure 1:
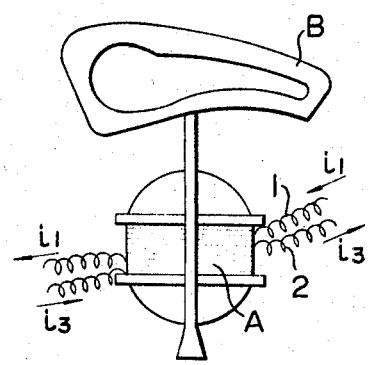
Figure 3:
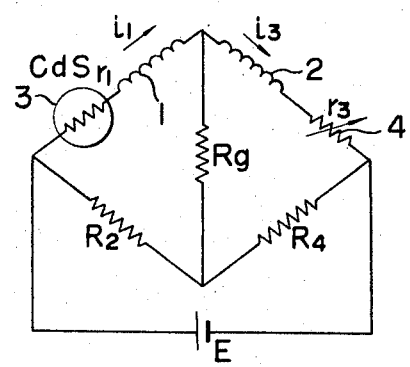
FIG. 3 represents an electric circuit for said device.

Referring to FIGS. 1 and 3, 1 designates one coil, and 2 a second coil; 3 is a light-sensing element and 4 an iris-adjusting member respectively. If iris blades or diaphragm B is driven by a rotor or coil frame A of the meter as in FIG. 1 and when in the bridge circuit as shown in FIG. 3 electric current $i_1$ is passed across coil 1 through the light sensing element 3, (for instance, a CdS cell having a resistance $r_1$), while current $i_3$ passes through the exposure adjusting portion 4 relating to the sensitivity of the film or shutter speed or iris-value and reversely through the other coil 2, the currents $i_1$ and $i_3$ passing through the coils 1 and 2 of said bridge circuit can be respectively represented in the following formulae:

$$i_1 = E/\Delta [R_g(R_2+R_4)+R_2(r_3+R_4)] \quad (1)$$

$$i_3 = E/\Delta [R_g(R_2+R_4)+R_4(r_1+R_2)] \quad (2)$$

$$\Delta = R_g(r_1+r_3)(R_2+R_4) \\ +r_1 r_3(R_2+R_4)+R_2 R_4(r_1+r_3) \quad (3)$$

In these formulae, $R_2$, $R_4$ and $R_g$ represent constants of the circuit resistance respectively at the coil side 1, coil side 2 and their connecting portion or junction respectively, of which values may be suitably specified. E is the voltage of the electricity source $r_1$ and $r_3$ are the resistances respectively of said CdS cell and of said exposure adjusting portion. If the torques produced in the ammeter by such currents are designated respectively as $\tau_1$ and $\tau_2$ (dyne-cm.), the following equalities are to be established.

$$\tau_1 = \tfrac{1}{10}\beta \cdot i_1 \cdot L \cdot Z \cdot D \quad (4)$$

$$\tau_2 = \tfrac{1}{10}\beta \cdot i_3 \cdot L \cdot Z \cdot D \quad (5)$$

$\beta$ = clearance magnetic flux density (gauss),
L = length of coil (cm.),
D = diameter of coil (cm.), and
Z = number of turns of coil.

Since these various conditions of the coil per se are the same in both of said coils 1 and 2, an inequality $\tau_1 > \tau_2$ or $$r_1 < r_2$$

or an equality $$\tau_1 = \tau_2$$

is established depending on values of $i_1$ and $i_3$.

If the current $i_1$ is higher than current $i_3$, torque $\tau_1$ is to be larger than torque $\tau_2$ and consequently the coil frame A is to be rotated in one direction, and vice versa. In the case of $i_1 = i_3$, the coil frame A reaches an equilibrium condition and stands still. Then, it is in the position to give a desirable exposure, if the rectification of the diaphragm B or pointer secured to said coil frame has been correctly made.

Figure 2:
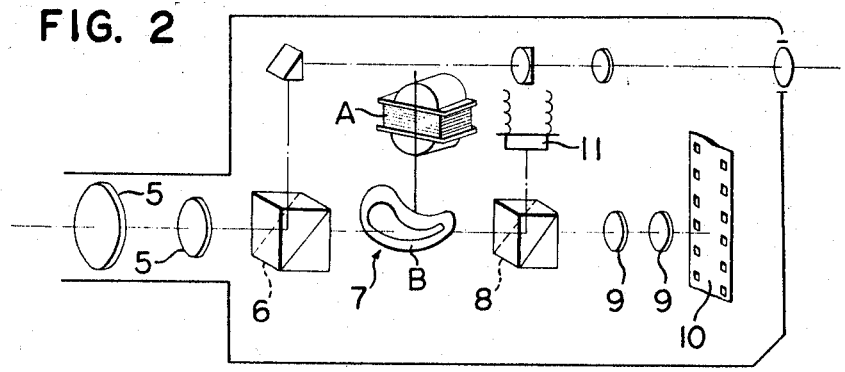
FIG. 2 is a diagram showing an arrangement of the electromagnetic controlling device as assembled in the camera body.

In FIG. 2 is shown a camera to which an embodiment of the exposure controlling means as referred to above is applied, 5 is an objective lens, 6 a half mirror, 7 said controlling device, 8 a half mirror, 9 a photographing lens, 10 a film and 11 a photoelectric element facing half mirror 8. In this case, the photoelectric element 11 receives through the half mirror 8 a part of the light to reach the film surface 10 after passing through an appropriate iris aperture.

From the Formulae 1 and 2, the following is to be obtained.

$$i_1 - i_3 = E/\Delta(R_2r_3 - R_4r_1) \qquad (6)$$

In the above formula, if $r_3$ is assumed to be a resistance value determinable only by the sensitivity of film, it is a constant when a predetermined particular film is used. As the resistance $r_1$ relating to the CdS cell is a variable value depending upon the brightness of the photographic subject, the following relationships can be established:

$$R_2r_3 - R_4r_1 > |o \rightarrow i_1 > i_3 \qquad (7)$$

$$R_2r_3 - R_4r_1 < |o \rightarrow i_1 < i_3 \qquad (8)$$

wherein $R_2r_3$ is a constant.

Figure 4:
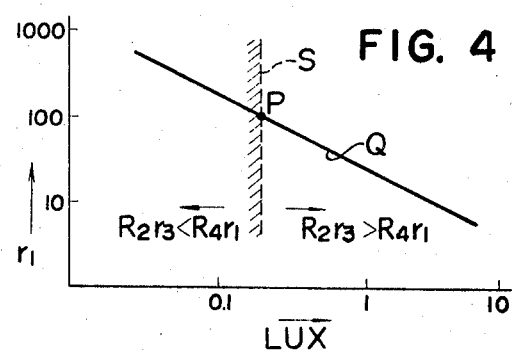
FIG. 4 represents a sensitivity graph relating to the intensity of illumination and resistance of photoelectric element.

Now, when the brightness of the subject to be photographed is increased, the resistance $r_1$ of the CdS cell in the Formula 6 is decreased to break down the equilibrium condition. In view of the Formulae 4 and 5 as well as $i_1 > i_3$ in the Formula 7, the relation $r_1 > r_3$ thus results. Accordingly the coil frame A rotates in a direction so as to narrow the iris aperture. Following the decrease in diameter of the aperture, $i_1$ increases and finally the condition of $R_2r_3 = R_4r_1$ and consequently $\tau_1 = \tau_2$ is reached. Thus, the coil frame A is stopped, when the desirable exposure condition is given. On the other hand, when the brightness of the subject to be photographed is darkened, the resistance $r_1$ of the CdS cell becomes larger as compared with the value of the equilibrium condition and in consequence the condition, $i_1 < i_3$ and consequently $\tau_1 < \tau_3$ is realized. The coil frame A thus rotates in the other direction so that the iris aperture becomes larger. Correspondingly $r_1$ becomes gradually smaller to finally attain the condition; $R_2r_3 = R_4r_1$, i.e., $\tau_1 = \tau_2$, wherein the coil frame A stands still and the diaphragms B give a desirable exposure. In FIG. 4, wherein the resistance $r_1$ of the CdS cell and illumination intensity at the photoelectric element are taken respectively as ordinate and abscissa, a longitudinal division line (or a balancing line) S passes through an balancing point P on an equilibrium curve Q. In the right hand side of said longitudinal line, the relation $R_2r_3 > R_4r_1$ is established, while in the left side $R_2r_3 < R_4r_1$. The point P, and accordingly the division line S is shifted automatically to the right or left depending upon the condition of the subject to be photographed, and the coil frame A always tends to retain the condition of $R_2r_3 = R_4r_1$.

Figure 5:
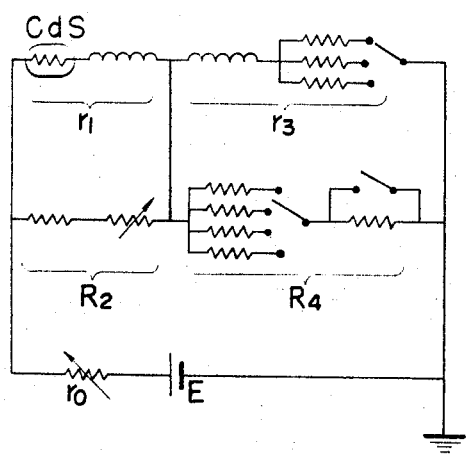
FIG. 5 is a modification of the electric circuit.

FIG. 5 shows a modification of the electric circuit shown in FIG. 3, which is adapted to establish a relationship of $r_1R_4 = r_3R_2$, when $R_g = 0$. In FIG. 5 $r_3$ and $R_4$ include step adjustment resistance and $R_2$ incorporates a variable resistance. An external variable resistance $r_0$ is utilized.

What we claim:

1. An electromagnetic exposure controlling device comprising a galvanometer including a rotor member, an iris diaphragm coupled to said rotor member for being moved thereby, said galvanometer including two coils, a Wheatstone bridge circuit having one branch with a leg including a photocell of resistance $r_1$ and one of said coils connected in series, and a second leg including an adjustable compensation resistor of resistance $r_3$ and the other of said coils connected in series, said Wheatstone bridge circuit having a second branch with first and second legs respectively including resistance elements of values $R_2$ and $R_4$ at least one of which is adjustable and a leg joining said branches at the junctures of respective legs thereof, said coils being placed in said circuit so that current flows in opposite directions therethrough to establish the relation $r_1R_4 = r_3R_2$ whereby variation in the light intensity applied to the photocell and adjustment of the value of the compensation resistor causes adjustment of the iris diaphragm until the bridge circuit is balanced.

2. A device as claimed in claim 1 comprising a resistor in said leg which is joined to said branches at the junctures of the respective legs.

3. A device as claimed in claim 1, wherein said leg which is joined to said branches at the junctions of the respective legs is a shunt.

References Cited

UNITED STATES PATENTS

| | | | |
|---|---|---|---|
| 1,719,556 | 7/1929 | McCoy | 324—140 |
| 3,124,033 | 3/1964 | Freudenschuss | 95—64 XR |
| 3,176,312 | 3/1965 | Reinsch | 352—141 |
| 3,183,808 | 5/1965 | Teshi et al. | 95—64 XR |
| 3,275,399 | 9/1966 | Johnson | 352—141 |

NORTON ANSHER, *Primary Examiner.*

J. F. PETERS, JR., *Assistant Examiner.*

U.S. Cl. X.R.

352—141; 250—229; 324—140; 95—10